INVENTORS
Ray E. Riethmann
Joseph Grout
William H. Peck, Sr. &
BY    Norman O. Peck Conder C Henry
ATTORNEY INVENTORS
Ray E. Riethmann
Joseph R. Grout
William H. Peck, Sr. &
BY   Norman O. Peck

ATTORNEY

United States Patent Office 3,273,718
Patented Sept. 20, 1966

3,273,718
HEAVY DUTY CENTRIFUGAL SEPARATORS
Ray E. Riethmann, Arvada, Joseph R. Grout, Wheat Ridge, and Norman O. Peck, Arvada, Colo., and William H. Peck, Sr., Tulsa, Okla.
Filed Aug. 6, 1963, Ser. No. 300,348
4 Claims. (Cl. 210—370)

Our invention relates to improvements in heavy duty centrifugal separators and more particularly to improvements in the species of separator disclosed in the U.S. patent to Peck, No. 2,796,990, granted June 25, 1957.

The mechanism illustrated and described by the Peck patent as well as our own is designed to remove moisture from solid granular substances of any kind and particularly from such substances as sand, coal, ore or the like. In general, the apparatus covered by the Peck patent embodies a rotatable basket or separator unit for subjecting slurry to be separated to centrifugal force, the sides of the basket comprising a series of concentrically disposed vertically spaced rings within which is positioned an impeller which includes vertically spaced vanes. An independently operable carrier surrounds the basket and is coaxially and rotatably supported with repect thereto. Upstanding pulleys are mounted on the carrier on which pulleys are looped a series of sets of endless belts having elastic inner surfaces. These belts are arcuately guided and engaged by the basket rings to substantially close the spaces between them, the arrangement being such that the solid granules in the slurry are discharged from the basket through the end gaps between the pairs of pulleys under centrifugal force and at the same time the liquid in the slurry is discharged from between the rings and belts while the carrier and basket are rotating together at differential speeds.

The Peck centrifuge has proved to be exceptionally satisfactory, but it has serious defects because different parts thereof are subjected to excessive wear and the design of the machine parts results in loss of efficiency. For example, in the Peck mechanism round basket rings are employed. In operation, the granular solids in the slurry pack between the basket rings to form filter media. This media is restricted because of the use of round rings which results in the formation of filter cakes which provide good filtering results. However, losses of effluent solids can be lowered by providing deeper cakes. Also, no provision is made in the Peck mechanism for preventing excessive wear or abrasion of either the pulley surfaces between the spans of the belts or the inner wall of the housing enclosing the mechanism, and the design of the impeller within the basket results in loss of efficiency.

Accordingly, one object of our invention is to so shape the filter rings of the filter basket as to increase the depth of the filter media or cakes between the rings and thereby prevent unnecessary losses of effluent solids.

Another object of our invention is to modify the belt-pulley combination of the Peck machine by a new kind of belt which when assembled in series on a pair of pulleys effectively cover their external surfaces and thereby protects them from abrasive wear of the granular solids in the slurry being separated.

Another object of our invention is to modify the pulleys themselves to increase their usefulness.

Another object of our invention is to redesign the impeller of the Peck mechanism to more effectively distribute slurry over the entire filter zone of the basket.

Another object of our invention is to provide means for directing liquid separated from the slurry downwardly through the bottom of the machine.

Another object of our invention is to provide means for minimizing abrasive wear on the inner wall of the machine housing.

These and other objects of our invention will become apparent from the detailed description to follow and from the drawings, in the latter of which so much of the old type separator is illustrated as is necessary to show our improvements therein and in which like reference characters and numerals are used in all of the figures to designate the same parts. Referring to such drawings—

FIG. 7 is a vertical sectional view of the basket;

Figure 1:
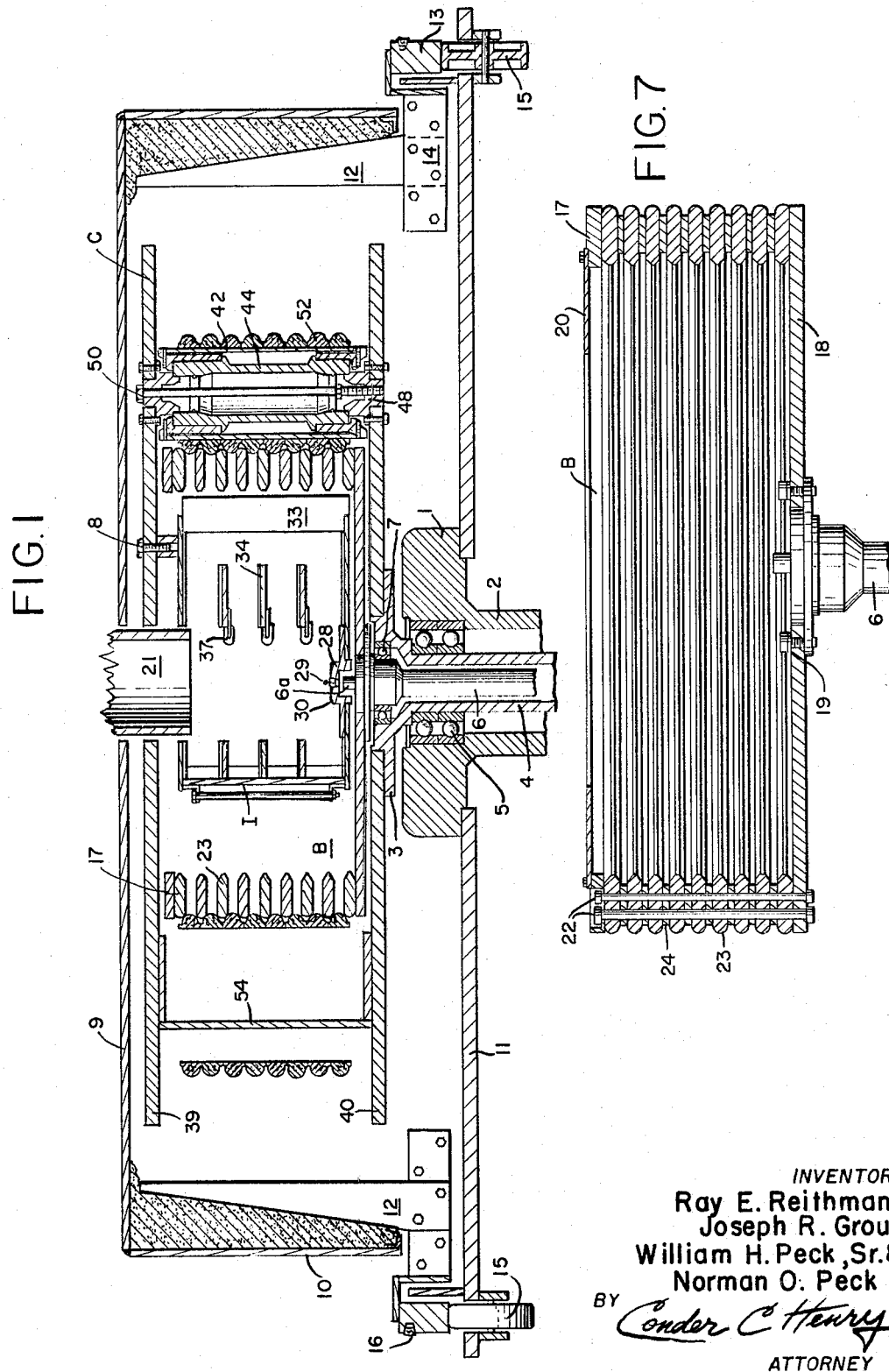
FIG. 1 is a vertical sectional view of a centrifuge or centrifugal separator illustrating the arrangement of the main component parts of our invention.

Our invention is exemplified in a centrifugal separator or centrifuge which comprises several main component parts as follows: A rotatable carrier C; a separator unit B independently rotatable with respect to and coaxially disposed within the carrier, the said unit including a basket and an impeller I, the latter of which is secured to and rotatable with the carrier; scrapers 12 for scraping solid material from the inner wall of the housing of the machine, the said scrapers being coaxially mounted exteriorly of the carrier and independently rotatable with respect to both the basket and carrier, and means whereby liquid and solid constituents of the slurry to be separated may be discharged from the machine through different channels. The machine may be mounted on any suitable base and is designed for high speed operation, for example 1400 r.p.m.

Referring in more detail to the annexed drawings, our separator is supported on the head 1 of a fixed tubular column 2, which encloses the drive shafts hereinafter described. The rotatable carrier, which is designed generally by the letter C, is secured to a flange 3 at the upper end of the main tubular drive shaft 4, which shaft extends downwardly through the said support column and is journalled in the head of such column on ball bearings 5.

Letter B designates generally the separator unit which, as previously stated, comprises a basket and an impeller. The basket is concentrically and rotatably located within the carrier and is secured to a flange on the upper end of a solid drive shaft 6, which shaft has an extension 6a thereon and depends downwardly through the aforesaid tubular carrier drive shaft 4 and is journalled at its upper end on ball bearings 7 carried by the flange 3 of such tubular shaft. The said solid and tubular shafts are driven at differential speeds by mechanism not shown but which is well known in the art.

The impeller, which is designated generally by the letter I, is concentrically positioned within the basket and is secured to the upper plate of the carrier by stud bolts 8 and thereby is carried by and rotates with the carrier.

Figure 2:
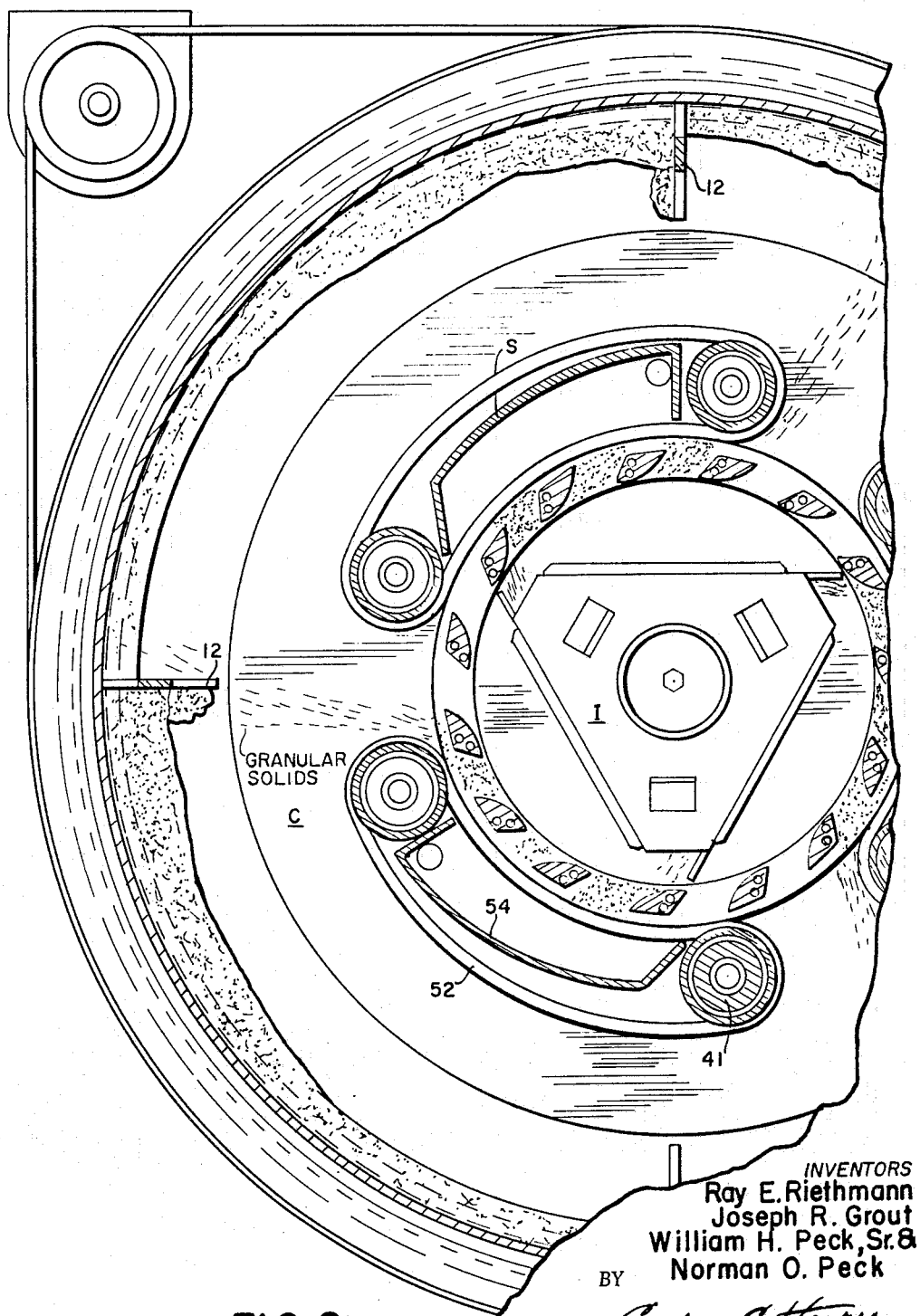
FIG. 2 is a partial horizontal sectional view showing the relationship of the pulley mounted belts to the basket and the relationship of the scrolls to the pulleys as well as the scrapers to the housing wall.

A housing encloses the entire assembly. Such housing includes a top wall 9, a circular vertically extending side wall 10 and a bottom wall or machine base plate 11, the latter of which is carried by the machine support (not shown). Positioned within the housing between the carrier and the housing wall are a plurality of scrapers 12 which are secured at their lower ends to a circular ring 13 by brackets 14, which ring rides on rollers 15 rotatable on axles secured to the bottom wall of the housing. The ring and scrapers may be driven around the inside wall of the housing by any suitable means. As shown they are driven by a pulley driven belt 16. By this arrangement when sand, for example, exits under centrifugal force from between the rings of the basket through the spaces between the pairs of pulleys on the carrier as shown by FIG. 2, the sand builds up on the inner housing wall. Because the scrapers are spaced from such wall and are tapered upwardly on the wall facing edges thereof, they start downward flow of sand toward the bottom wall of the housing through which it is discharged. At the same time some sand is left on the housing wall and serves as a protective shield because any sand thereafterwards propelled through the gaps between the pairs of pulleys strikes sand and not metal.

Thus far we have described the arrangement of the main components of our centrifuge, which parts are in themselves new and will now be described.

Figure 9:
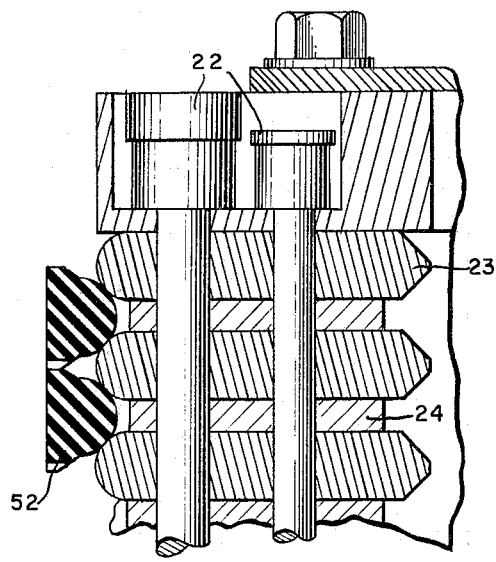
FIG. 9 is a fragment of a sectional view showing how the basket rings are assembled.
Figure 10:
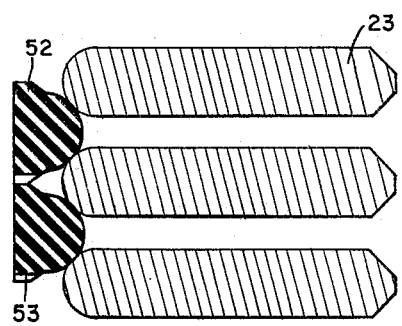
FIG. 10 is also a fragment of a sectional view illustrating the shape of the basket rings and the relationship of the filter belts to them.

As shown by FIGS. 7, 9 and 10, the basket comprises a top ring 17 and a bottom plate 18, the latter of which, as previously stated, is secured to the solid drive shaft 6 by means of bolts 19. For present purposes, the most important and novel feature of the basket lies in its sides, which comprise a series of specially shaped concentric rings 23 spaced apart vertically by relatively narrow spacers 24 distributed around the rings. The assembly is clamped together by a series of bolts which extend through the top and intermediate rings, the spacers and the bottom plate.

Such rings may be fabricated of any suitable material resistant to abrasion, such as metal or one of the plastics, and, instead of being round as has heretofore been the case, they are flat and rounded on the outer periphery thereof for proper contact with the filter belts. The inner ends of the basket rings are non-circular in cross section. As shown, such ends have convergingly sloping sides. The reason for using rings so shaped is that the filter cakes formed between the rings are much thicker than cakes formed between round rings because granular solids in the media being filtered neck down between the rings forming a restricted filter media zone which necessarily increases the depth of the filter cakes and thereby greatly increases the efficiency of the machine.

Figure 3:
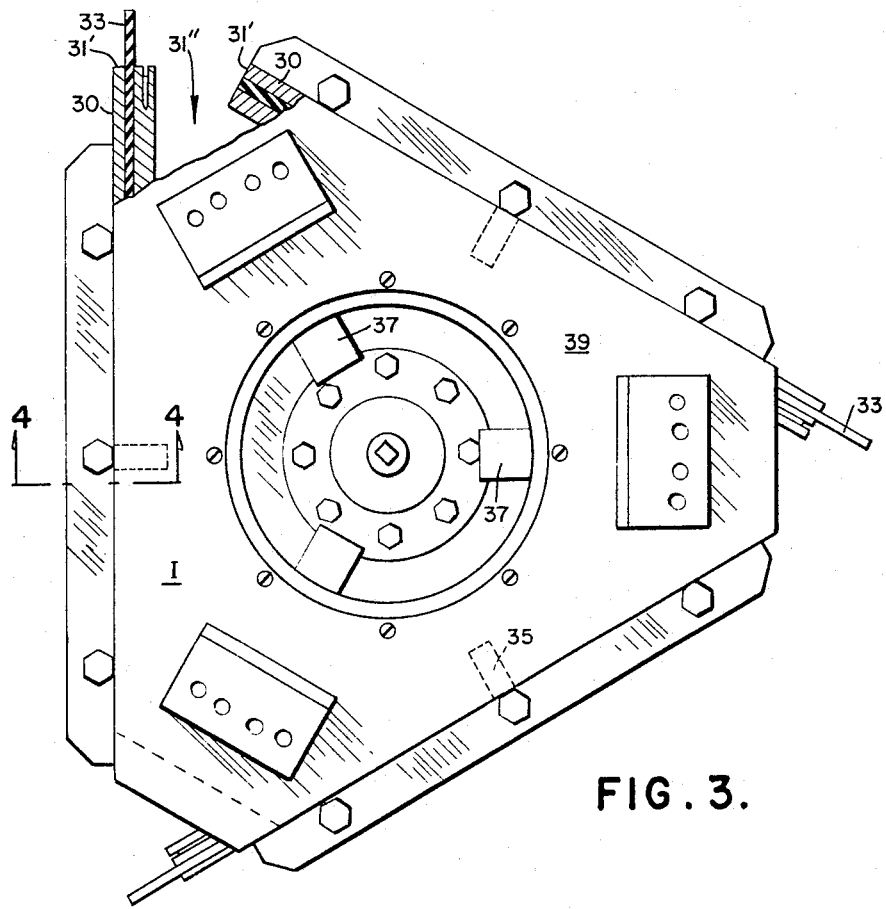
FIG. 3 is a top plan view of the impeller.
Figure 4:
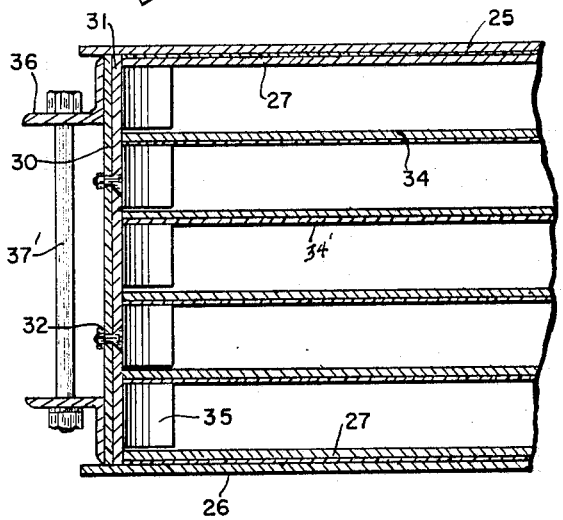
FIG. 4 is an enlarged sectional view of the impeller taken along the line 4—4 of FIG. 3.
Figure 5:
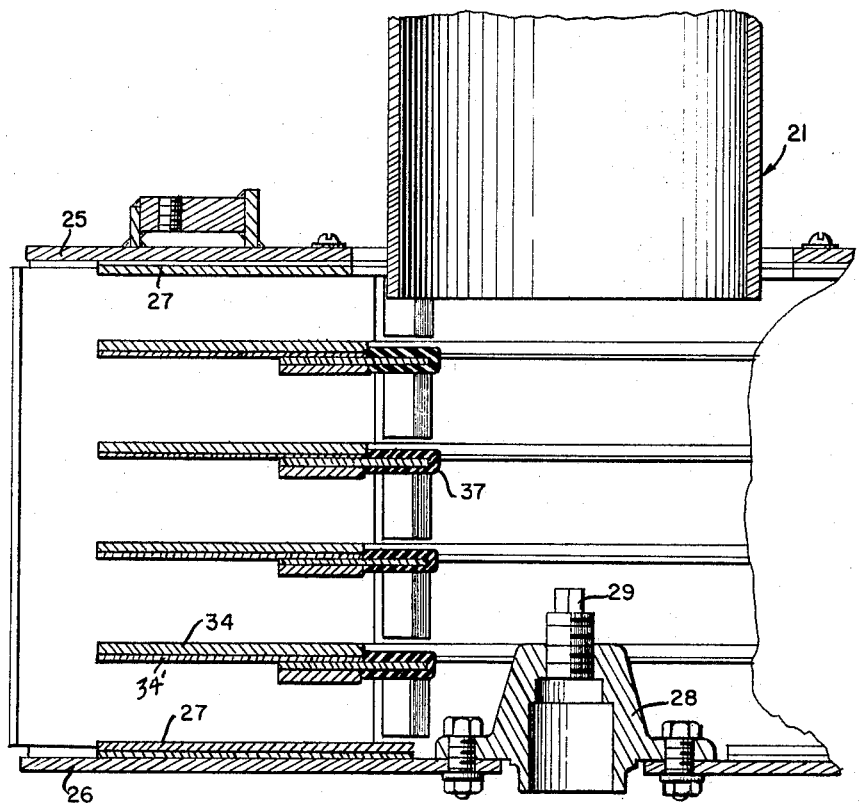
FIG. 5 is a sectional view of the impeller showing the feed chute, the impeller divider plates and deflectors.
Figure 6:
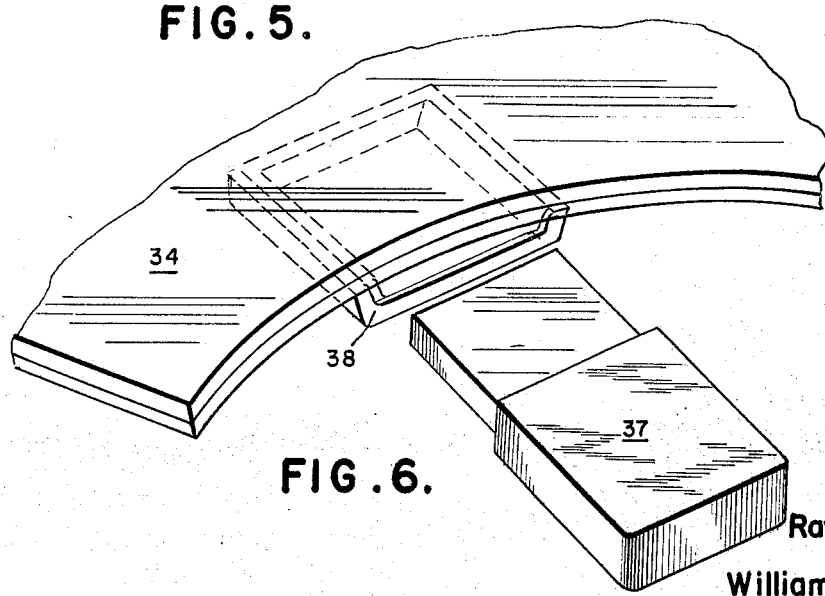
FIG. 6 is a perspective view showing how the deflectors are attached to the impeller divider plates.

With respect to the impeller I, it is centered within the basket but rotates with the carrier. The basket and belts constitute the filter unit. Referring to FIGS. 3, 4 and 5, it will be seen that the impeller, which in plan is of general triangular shape, is hollow and comprises a top horizontal plate 25 and a horizontal bottom plate 26, both of which are protected on inner surfaces by liner or wear plates 27 fabricated of non-metallic material, such as rubber or the like. On the bottom plate is secured a bell-shaped member 28 enclosing but spaced from the extension 6a on shaft 6 and provided with a pipe plug 29 for lubrication purposes. The purpose of this arrangement is to hold the impeller in place if it gets out of balance for any reason. Flat vertical metallic plates 30 having non-metallic liner plates 31 secured thereto by flathead bolts 32 form the three sides of the impeller, and these side plates have vertical side edges 31' which are laterally spaced from each other to provide vertically elongated discharge gaps 31" at the corners of the impeller. For improving the efficiency of the impeller, elongated flaps 33 fabricated of any suitable flexible material, may be secured along the lead edges 31' of the side plates to project outwardly therefrom and coact with the vanes hereinafter described in directing slurry propelled from the impeller through the aforesaid gaps 31" against the inside basket wall, which wall constitutes the filter zone of the machine.

As suggested above, provision is made for distributing slurry evenly along the entire filter zone. For this purpose a plurality of generally triangular shaped, horizontally disposed vanes or divided plates 34' spaced apart vertically by spacers 35 and having liner plates 34 secured thereto, are arranged between the top, bottom and side plates of the impeller. In order to secure the assembly together, angle irons 36 are welded to the long sides of the top and bottom plates in such manner that a flange on each iron extends outwardly, and vertically aligned holes are drilled through the irons to accommodate machine bolts 37'. Upon tightening the nuts on such bolts the divider plates are clamped between the spacers and the top and bottom plates. Also, it will be seen that the top plate and the vanes or divider plates are provided with centrally aligned openings through which slurry may be introduced through chute 21.

Extending into the central openings in the vanes or divider plates are deflectors 37. These deflectors are fabricated of metal and are covered by rubber or other protective wear material. They are in the form of elongated blocks or strips and are held in place by U-shaped clips 38 welded to the undersides of the vanes. It will be understood that the number of deflectors employed will depend upon the feed of the machine. Their purpose is to make cuts of the feed as it enters the internal center sections of the impeller so that the feed may be evenly distributed under centrifugal force to and over the entire filter zone and thereby make complete use of all of the filter belts hereinafter described.

Figure 8:
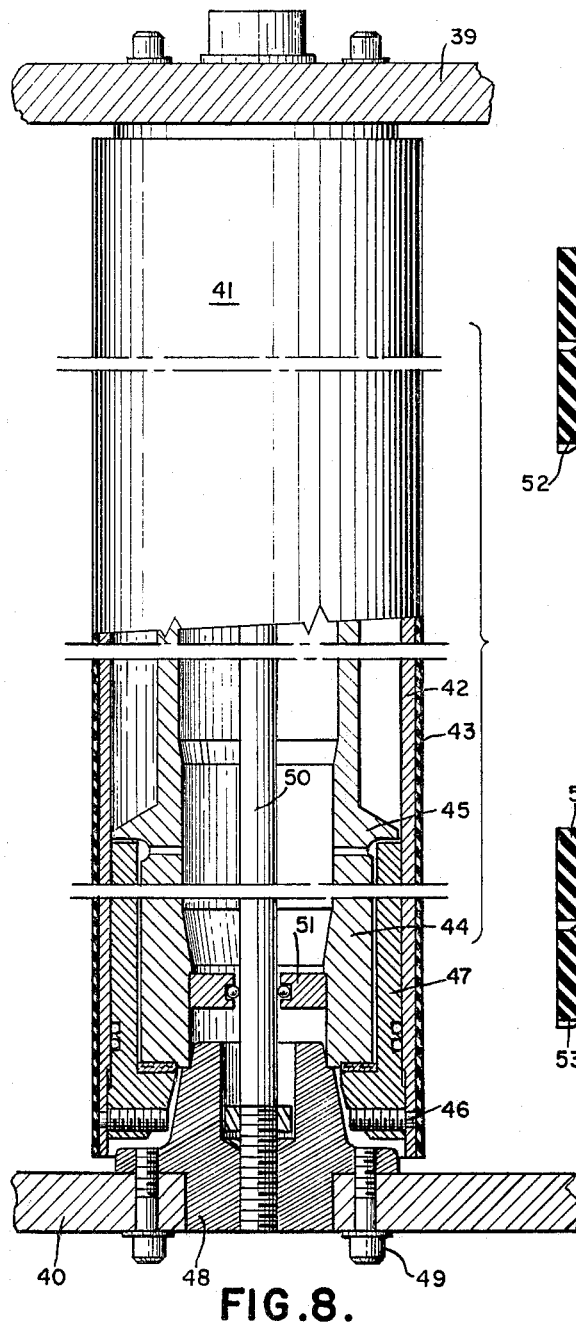
FIG. 8 is an elevational view partly in section of a carrier idler pulley.

Coming now to the carrier C and the machine parts mounted thereon, the carrier includes top and bottom plates 39 and 40, the top plate having a central opening therein through which the delivery chute 21 extends. Positioned between such plates externally of and juxtaposed to the basket are three pairs of upstanding circumferentially disposed filter belt or idler pulleys, designated generally by the numeral 41. The number of pairs of pulleys is not critical, but we have found that three pairs produce excellent results. These pulleys are mounted for rotation between the top and bottom plates of the carrier and are constructed as follows:

Each pulley or roller 41 (see FIG. 8) consists essentially of an elongated cylindrical metallic shell 42 which is protected from the abrasive action of granular filtered solids thrown outwardly from the basket under centrifugal force by a rubber or other similar cover 43. Located interiorly of the shell and spaced laterally therefrom is a metallic cylindrical pillar tube 44 having two circumferentially extending vertically spaced flanges 45 intermediate the ends thereof, and seated on such flanges are elongated bushings or bearings 47 which are inbent to extend partially over the ends of the tube. These bushings or bearings are fabricated of aluminum alloy. They slidably engage the tube 44 and are secured to the shell by set screws 46, whereby the shell and bushings may rotate as a unit around the end portions of the tube.

Since the pulley was designed for rotation between the top and bottom plates of the carrier, the pillar tube is non-rotatably mounted on two inwardly facing bosses 48 which are bolted to such plates by bolts 49. Extending downwardly through the top plate and the boss secured to it and centrally through the tube is an elongated pillar tube bolt 50 which is screwed into the lower boss. And in order to prevent foreign matter from entering the tube, baffles in the form of washers 51 are slipped over the bolt and are fixed in position near its ends.

It has been stated that the sleeve bushings are fabricated of aluminum alloy, and it seems desirable to state why we adopted this bearing material.

Although the filter belt pulleys do not operate at high speeds which would increase friction on any bearing material, yet such pulleys undergo terrific centrifugal forces which cause severe pulley shaft deflections. This results in an inordinant amount of friction between the bushings and the pillar tube. We have found through actual experimentation and through trial and error methods, using bronze bushings and other types of bearings, that no material or bearings we tried other than aluminum alloy would withstand the forces to which the pulleys are subjected when used on separators of the kind revealed herein.

The purpose of the idler pulleys is to carry filter belts. A series of vertically disposed endless belts 52 are looped around each pair of pulleys and frictionally engage the basket rings and are driven by such rings, the number of belts in the series being sufficient to close so much of the spaces between contiguous rings as are contacted by them. The pairs of pulleys and consequently the looped ends of the belts are spaced laterally from each other to form discharge gaps for filtered solids. No special means has been provided for tightening the belts or for positively causing them to frictionally engage the basket rings, although such means could be provided without departing from the spirit of our invention. We have found that since the belts are looped around the carrier mounted pulleys, the outer reaches thereof swing freely outwardly under centrifugal force as the carrier rotates, which results in tensioning the inner reaches against arcuate sections of the basket rings. It will be understood, however, that any conventional form of belt guides or tighteners may be employed.

Heretofore, in mechanisms of the kind disclosed herein, no steps were taken to prevent rapid wear of the external surfaces of the pulleys, which necessitated frequent replacements. The principal cause for such wear is attributable to the use of round belts. When round belts are employed, some of the granular solids in the slurry being filtered would be projected from the basket with considerable force against those pulley surfaces which were not protected by the belts and act as a grinding compound to quickly destroy the pulleys. This defect is eliminated in our construction by applying protective covers on the pulleys but mainly by the use of a specially designed belt-pulley combination which will now be described.

Our belts are flatter and wider on one side thereof than they are on the other and, therefore, may somewhat inappropriately be called "flat belts." Each belt is arcuately shaped on one of its sides to fit between adjacent basket rings and is flat on its opposite side and of such width that when a series of belts are looped around a pair of pulleys, the edges of the flat sides will be in contact with each other and thereby provide a functional cover for the pulleys except for those portions above and below the top and bottom belts, which portions are protected by the rubber cover 43. From the foregoing, it will be seen that at least one novel feature of our invention lies in the fact that the belts effectively protect the pulleys from abrasive wear, and it will be understood that the pulley engaging sides of the belts need not necessarily be flat. They can be any other shape so long as they are wide enough to contact each other when a series is assembled on a pair of pulleys.

Regarding the belts per se, each belt is fabricated of rubber or any equivalent of rubber and is reinforced adjacent its flat or pulley-contacting side, which side may be covered by canvas or the like, with a plurality of longitudinally extending, comparatively non-stretchable reinforcements such as steel cables or dacron cords, which reinforcements are bonded to the body of the belt. The inner or ring contacting side of each belt is more or less elastic and is provided with edge or other grooves 53 to permit of the escape of liquids from between belts after filtration.

Obviously, the length and cross-sectional dimensions of our belts may vary with the design of the machine in connection with which they are used and that the contour of the ring contacting surfaces thereof may vary with the basket design and for different kinds of material to be separated.

Provision is made in our apparatus for positively preventing the separated liquid from mixing with the comparatively dry solid material after separation. For this purpose, a scroll or baffle 54 is secured between the top and bottom plates of the carrier and between the outer and inner reaches of the belts on each pair of pulleys. These scrolls are in the form of vertically extending plates which preferably have inwardly bents ends. Their function is to catch the liquid which is filtered between the rings of the basket and filter belts and direct it downwardly through openings (not shown) in the bottom plate 11 of the carrier so that such liquid will not mix with the solid products which have been separated and which by the action of the machine is thrown against the inner housing wall and discharged in a separate manner as previously intimated.

In the operation of our centrifuge, the slurry to be separated is introduced through the feed chute 21 into the impeller I, which rotates with the carrier C. As the slurry or feed entering the impeller is cut by the deflectors 37, it is picked up by the vertically spaced horizontally disposed impeller vanes 34. Because the spaces between the vanes are unobstructed for all practical purposes, the slurry is propelled by centrifugal force through such spaces against and evenly distributed over the entire inner surface of the basket wall. Such force causes the granular slurry solids to pack between the flat basket rings 23 to form loosely compacted, relative deep filter cakes as well as causes the slurry liquid to be propelled from between the rings and belts contacting them against the scrolls 54, the latter of which direct the liquid downwardly toward and through openings in the bottom of the machine housing.

At the same time a continuous stream of granular filtered solids is directed toward and distributed over the inner side wall of the housing. This is due to the relationship of the pulleys, belts and basket and the construction of the basket. As the pairs of carrier mounted pulleys travel around the basket, the belts carried by them close merging portions of the spaces between the basket rings and simultaneously and continuously uncover ever changing sections of the basket rings opposite the gaps between the pulleys. Thus, as the filter cakes between the rings become unconfined by the belts, the granular solids in such cakes will become dislodged from between the rings and thrown outwardly under centrifugal force in a steady stream toward the housing wall. Initially, such solids are deposited upon or pack against the housing wall where they are scraped off by scrapers 12 and expelled from the machine through a channel separate from that provided for the liquid slurry, except some of such solids are left on the wall where they act as a protective cover therefor due to the fact that any further solids propelled from the basket strike such cover and not the housing wall.

Having thus described our invention, what we claim as new and desire to secure by Letters Patent is:

1. In a centrifugal separator, the combination of a carrier rotatable on a vertical axis, a basket disposed concentrically in and rotatable relative to said carrier, said basket including a set of vertically spaced rings, pairs of vertical rollers rotatably mounted in said carrier at the outside of said basket, a set of vertically stacked endless belts passing around each pair of said rollers, said belts having inner reaches in engagement with said basket rings and closing the spaces between said rings, a hollow impeller rotatable with and supported by said carrier centrally in said basket, a material delivering chute communicating with the upper portion of said hollow impeller, said impeller having a closed bottom and including a plurality of vertically spaced horizontal plates and vertical side plates at perimetric edges of said horizontal plates, said horizontal plates being provided with vertically aligned central openings below said material delivering chute, a plurality of deflectors secured to said horizontal plates and projecting inwardly into said openings whereby to deflect and spread material delivered by said chute downwardly through the impeller, said side plates having spaced apart vertical side edges defining discharge gaps at the perimeter of the impeller whereby material spread downwardly through the impeller by said deflectors may be discharged substantially uniformly through said gaps against the rings of said basket and the inner reaches of said belts, vertically elongated flexible flaps provided at said vertical side edges of said vertical plates of said impeller and extending outwardly therefrom toward said basket to assist in directing material discharged through said gaps against said basket and belts, and means for rotating said carrier and said basket at relatively different speeds.

2. The device as defined in claim 1 together with a relatively stationary housing enclosing said carrier and said basket, said housing including a peripheral wall on which material discharged by said belts is deposited, and at least one vertically elongated scraper mounted for revolving movement adjacent the inside of said peripheral wall, said scraper having an oblique scraping edge spaced further away from said peripheral wall at its upper end than at its lower end, whereby to permit a thicker accumulation of material along the upper portion of the peripheral wall than along the lower portion thereof.

3. In a centrifugal separator, the combination of a carrier rotatable on a vertical axis, a basket disposed concentrically in and rotatable relative to said carrier, said basket including a set of vertically spaced rings, each of said rings having a horizontally elongated cross-section with flat upper and lower surfaces, rounded outer peripheral edges and bevelled inner peripheral edges, the flat upper and lower surfaces of said rings defining between the rings a set of spaces of a uniform height and substantial radial width in relation to said height, pairs of vertical rollers rotatably mounted in said carrier at the outside of said basket, a set of vertically stacked endless belts passing around said rollers in each pair, said belts having inner reaches in engagement with said rounded outer peripheral edges of said basket rings and closing said spaces between the rings at the outside of the basket, said belts having rounded inner portions engaging said rounded outer peripheral edges of said basket rings and also having relatively wide outer portions with flat outer surfaces engaging said rollers, said outer portions of said belts having contiguous upper and lower edges in contact with one another, whereby the belts in each set protectively cover surfaces of the rollers around which the belts are passed, means for delivering material into the spaces between said rings and against the reaches of said belts closing said spaces, and means for rotating said carrier and said basket at relatively different speeds.

4. The device as defined in claim 3 wherein said relatively wide outer portions of said belts are provided at the contiguous upper and lower edges thereof with grooves to permit escape of liquid from the inside to the outside of the inner reaches of the belts.

References Cited by the Examiner

UNITED STATES PATENTS

| | | | |
|---|---|---|---|
| 1,280,469 | 10/1918 | Hiller | 210—370 |
| 2,435,665 | 2/1948 | Woolaver | 210—377 |
| 2,796,990 | 6/1957 | Peck | 210—370 |
| 3,104,225 | 9/1963 | Benedetto | 233—28 |

FOREIGN PATENTS 421,336  5/1947  Italy.

REUBEN FRIEDMAN, *Primary Examiner.*

J. L. DE CESARE, *Assistant Examiner.*